US010831699B2

(12) United States Patent
Sakamoto et al.

(10) Patent No.: US 10,831,699 B2
(45) Date of Patent: Nov. 10, 2020

(54) COMPUTING CONTROL SYSTEM AND COMPUTING CONTROL METHOD

(71) Applicant: FUJITSU LIMITED, Kawasaki (JP)

(72) Inventors: Takuya Sakamoto, Yokohama (JP); Masahiro Doteguchi, Yokohama (JP); Takashi Arakawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/531,259

(22) Filed: Aug. 5, 2019

(65) Prior Publication Data

US 2020/0050577 A1     Feb. 13, 2020

(30) Foreign Application Priority Data

Aug. 7, 2018   (JP) .................. 2018-148475

(51) Int. Cl.
 *G06F 15/173* (2006.01)
 *G06F 9/54* (2006.01)
 *G06F 9/28* (2006.01)

(52) U.S. Cl.
 CPC .......... *G06F 15/17331* (2013.01); *G06F 9/28* (2013.01); *G06F 9/54* (2013.01)

(58) Field of Classification Search
 CPC .... G06F 12/023; G06F 12/1408; G06F 16/13; G06F 16/1727; G06F 16/1744; G06F 16/2365; G06F 17/18; G06F 21/62; G06F 21/6209; G06F 21/78; G06F 2212/1044; G06F 2212/152; G06F 2212/401; G06F 2212/402; G06F 3/0481; G06F 3/0604; G06F 3/0605; G06F 3/0608; G06F 3/0623; G06F 3/0638; H04L 65/607; H04L 69/04; H04L 9/085; H04N 21/234354; H04N 21/2381; H04N 21/41407

See application file for complete search history.

(56) References Cited

U.S. PATENT DOCUMENTS

| | | | | |
|---|---|---|---|---|
| 5,758,151 | A | * | 5/1998 | Milligan ............... G11B 27/002 |
| 6,480,935 | B1 | * | 11/2002 | Carper .................. G06F 12/023 |
| | | | | 235/380 |
| 6,487,597 | B1 | * | 11/2002 | Horie .................... G06F 3/0481 |
| | | | | 709/227 |

(Continued)

FOREIGN PATENT DOCUMENTS

JP     H03-265925 A     11/1991

*Primary Examiner* — Ninos Donabed
(74) *Attorney, Agent, or Firm* — Fujitsu Patent Center

(57) ABSTRACT

A computing system includes one or more processors configured to perform generation of a plurality of pieces of segment data by dividing first data, generate a plurality of pieces of extended data by performing an extension process on each of the plurality of pieces of segment data, each extended data having a size equal to a size of second data, generate first combination data by combining first extended data included in the plurality of pieces of extended data and the second data, perform transmission of the first combination data, in response to receiving data of a computation result calculated based on the first combination data, generate a first computation result related to the first extended data by dividing the data of the computation result, and generate a third computation result related to the first data by performing a reconstruction process based on the first computation result.

10 Claims, 10 Drawing Sheets

(56) References Cited

U.S. PATENT DOCUMENTS

| | | | |
|---|---|---|---|
| 7,508,760 B2* | 3/2009 | Akiyama | H04N 7/17318 |
| | | | 370/232 |
| 8,018,931 B2* | 9/2011 | Yamauchi | H04L 69/04 |
| | | | 370/389 |
| 8,077,863 B2* | 12/2011 | Hosaka | H04L 9/085 |
| | | | 380/28 |
| 8,565,576 B2* | 10/2013 | Chen | H04N 13/189 |
| | | | 386/216 |
| 9,361,025 B2* | 6/2016 | Wen | G06F 3/0605 |
| 10,477,246 B2* | 11/2019 | Keiflin | H04N 19/172 |
| 10,579,591 B1* | 3/2020 | Diamant | G06F 16/1727 |
| 2004/0196871 A1* | 10/2004 | Terry | H04W 28/06 |
| | | | 370/477 |
| 2010/0153064 A1* | 6/2010 | Cormode | G06F 17/18 |
| | | | 702/179 |
| 2011/0283021 A1* | 11/2011 | Koifman | G06F 3/0638 |
| | | | 709/247 |
| 2013/0148872 A1* | 6/2013 | Aisaka | H04N 1/387 |
| | | | 382/128 |
| 2015/0378613 A1* | 12/2015 | Koseki | G06F 3/0619 |
| | | | 711/103 |
| 2016/0034809 A1* | 2/2016 | Trenholm | G06F 8/35 |
| | | | 706/20 |
| 2016/0077960 A1* | 3/2016 | Hung | G06F 12/0246 |
| | | | 711/103 |
| 2016/0266814 A1* | 9/2016 | Shimokawa | G06F 3/0676 |
| 2017/0061311 A1* | 3/2017 | Liu | H04L 43/04 |
| 2019/0004799 A1* | 1/2019 | Zbiciak | G06F 12/0875 |
| 2019/0087932 A1* | 3/2019 | Baek | H04N 1/00 |
| 2019/0129887 A1* | 5/2019 | Bowman | G06F 3/067 |
| 2020/0036786 A1* | 1/2020 | Yoneda | H04L 29/06 |

* cited by examiner

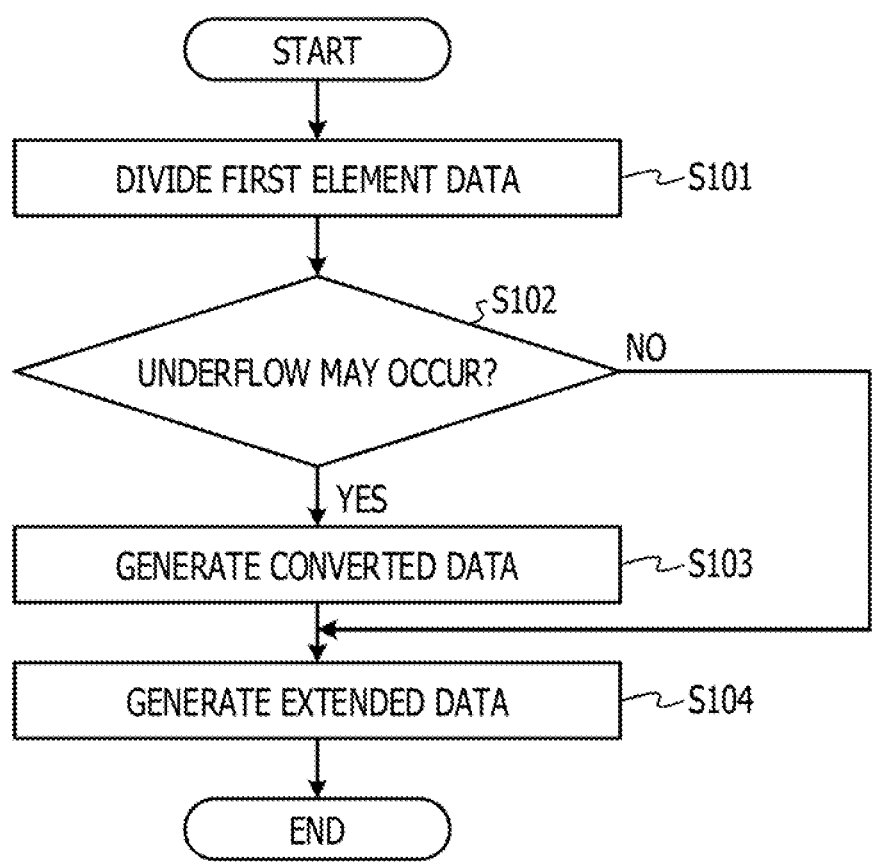

COMPUTING CONTROL SYSTEM AND COMPUTING CONTROL METHOD

CROSS-REFERENCE TO RELATED APPLICATION

This application is based upon and claims the benefit of priority of the prior Japanese Patent Application No. 2018-148475, filed on Aug. 7, 2018, the entire contents of which are incorporated herein by reference.

FIELD

The embodiments discussed herein are related to a computing control technique.

BACKGROUND

In recent years, studies on machine learning, which forms one field of studies of artificial intelligence, have become widespread due to a dramatic improvement in recognition accuracy of image recognition caused by a technology called deep learning, and developments of techniques that apply the machine learning have been remarkably accelerated. Calculations used in the deep learning are mainly enormous loop processes of basic calculations. Accordingly, in the deep learning, parallel processing is often performed using a great number of processors or multi-core processors to achieve improved efficiency.

One apparatus that performs parallel processing is a distributed-memory parallel computer. The distributed-memory parallel computer includes a plurality of calculation nodes, and a communication network that connects the calculation nodes with one another. Each calculation node does not directly refer to a memory of another one of the calculation nodes, but acquires data held by the other calculation node through exchange of messages between the calculation nodes. This exchange of messages is sometimes called message passing. One library standard for the message passing is a message passing interface (MPI) standard. Thanks to the unification of an application programming interface (API), the MPI provides high program portability between different parallel computers, and is often used in programs for parallel computers.

At present, a great number of dynamic arguments are used in the MPI due to the standardization of the API. Accordingly, processing of functions used in the MPI often involves processes such as argument checking and dynamic area securing, and this leads to significant software overhead. Such software overhead is noticeably incurred with a function called a collective communication function.

The collective communication function is a function for which processing proceeds with all the calculation nodes involved in the parallel processing performing communication and calculation, and involves a process of waiting for control to return to a caller of the function until calculations and exchange of data between the calculation nodes are completed. With the collective communication function, software overhead is incurred, in every calculation node, resulting in a reduction in overall processing efficiency. Thus, an improvement in overall processing performance may be achieved by reducing the number of times of use of the collective communication function.

One technique for reducing the number of communications between the calculation nodes is a technique called piggyback. The piggyback is a technique of combining two data areas beforehand to enable the data areas, which originally require two communications to be transferred, to be transferred by only one communication.

When the collective communication function in the MPI is executed, the communications between the nodes, and besides, calculations using transmitted data are performed simultaneously. Therefore, in the case where the piggyback involves two collective communication functions, obtaining proper results will be difficult if the two collective communication functions involved by the piggyback have different bit widths for calculation. Accordingly, it is preferable that elements used for the calculation before and after the piggyback have, the same bit width for the collective communication functions.

Here, processing of the collective communication function using the piggyback will be described below. This processing includes the following constituent processes. A first process is a conversion process of adding a string of 0 bits to an element having a smaller element size to cause the element sizes of two areas to coincide with each other. A second process is a combining process of combining the two data areas into a continuous data area. A third process is a collective communication process of calling the collective communication function using the combined data area, exchanging data between the calculation nodes, and performing a calculation in each calculation node. A fourth process is a separating process of separating the data area processed by the collective communication process into two original data areas. A fifth process is a reconstructing process of reconstructing data by eliminating the string, of 0 bits added by the conversion process from the data stored in the data areas separated by the separating process.

In each calculation node, the above-described five processes are performed in the following manner. First, the calculation node performs the conversion process, and, adds a string of 0 bits to an element of the data area that has the smaller element size of the two data areas involved in the piggyback, thus causing the element sizes of the two data areas to coincide with each other. Next, the calculation node performs the combining process, and transfers one of the data areas such that the two data areas form one continuous data area, thus combining the two data areas together. Next, the calculation node performs the collective communication process, and calls the collective communication function for the combined data area, and transfers the data area using collective communication. Next, the calculation node performs the separating process, and separates the combined data area into two data areas. Finally, the calculation node performs the reconstructing process, and eliminates the string of 0 bits added by the conversion process from one of the separated data areas to which the string of 0 bits has been added in the conversion process, thus reconstructing a calculation result of the original data.

There is a technique for implementing a highly cost-effective, high-speed multiplier having a relatively small number of gates. In this technique, input data is divided into items of segment data, calculations are repeatedly performed using the items of segment data, results of the calculations are digit-aligned, and thereafter the resulting values are sequentially added to obtain a final calculation result.

For example, the related art is disclosed in Japanese Laid-open Patent Publication No. 03-265925.

SUMMARY

According to an aspect of the embodiments, a computing system includes one or more processors configured to perform generation of a plurality of pieces of segment data by dividing first data, generate a plurality of pieces of extended data by performing an extension process on each of the plurality of pieces of segment data, each extended data having a size equal to a size of second data, generate first combination data by combining first extended data included in the plurality of pieces of extended data and the second data, perform transmission of the first combination data, in response to receiving data of a computation result calculated based on the first combination data, generate a first computation result related to the first extended data by dividing the data of the computation result, and generate a third computation result related to the first data by performing a reconstruction process based on the first computation result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart of a process of generating extended data according to Embodiment 2.

DESCRIPTION OF EMBODIMENTS

When data areas which are inputs for calculation are in a particular condition, a drop in overall processing efficiency may occur with the existing processing mode. Examples of such a condition include a condition in which a data area having elements with a smaller bit width is significantly larger than a data area having elements with a greater bit width.

This condition is described in detail below with reference to the case where there are two data areas, data area A and data area B. Here, the overall size of each of the data areas is referred to as an area size. The size of element data included in each area and used for an individual calculation is referred to as an element size. It is assumed here that the area size of data area A is significantly smaller than the area size of data area B, while the element size of data area A is greater than the element size of data area B.

In this case, when the existing processing mode of the piggyback is used, a string of 0 bits is added to the element data of data area B, which has a smaller element size. However, since the area size of data area B is large, a data conversion process of adding a string of 0 bits has to be performed a great number of times, resulting in much time required for the data conversion processes. Further, the area size will be very large after the data conversion, leading to a corresponding increase in the amount of data communication required for the collective communication function. Thus, a reduction in calculation efficiency of the whole processing may occur.

In the case of the aforementioned technique in which calculations are repeatedly performed using the items of segment data obtained by dividing the input data, the results of the calculations are digit-aligned, and the resulting values are sequentially added, combining and separating of the input data are not considered, and it is difficult to reduce the number of times of use of the collective communication function in the MPI.

Hereinafter, embodiments of a computing control system, a computing control method, and a computing control program disclosed in the present application will be described in detail with reference to the accompanying drawings. It is to be noted that the following embodiments are, not meant to limit the computing control system, the computing control method, or the computing control, program disclosed in the present application.

Figure 1:
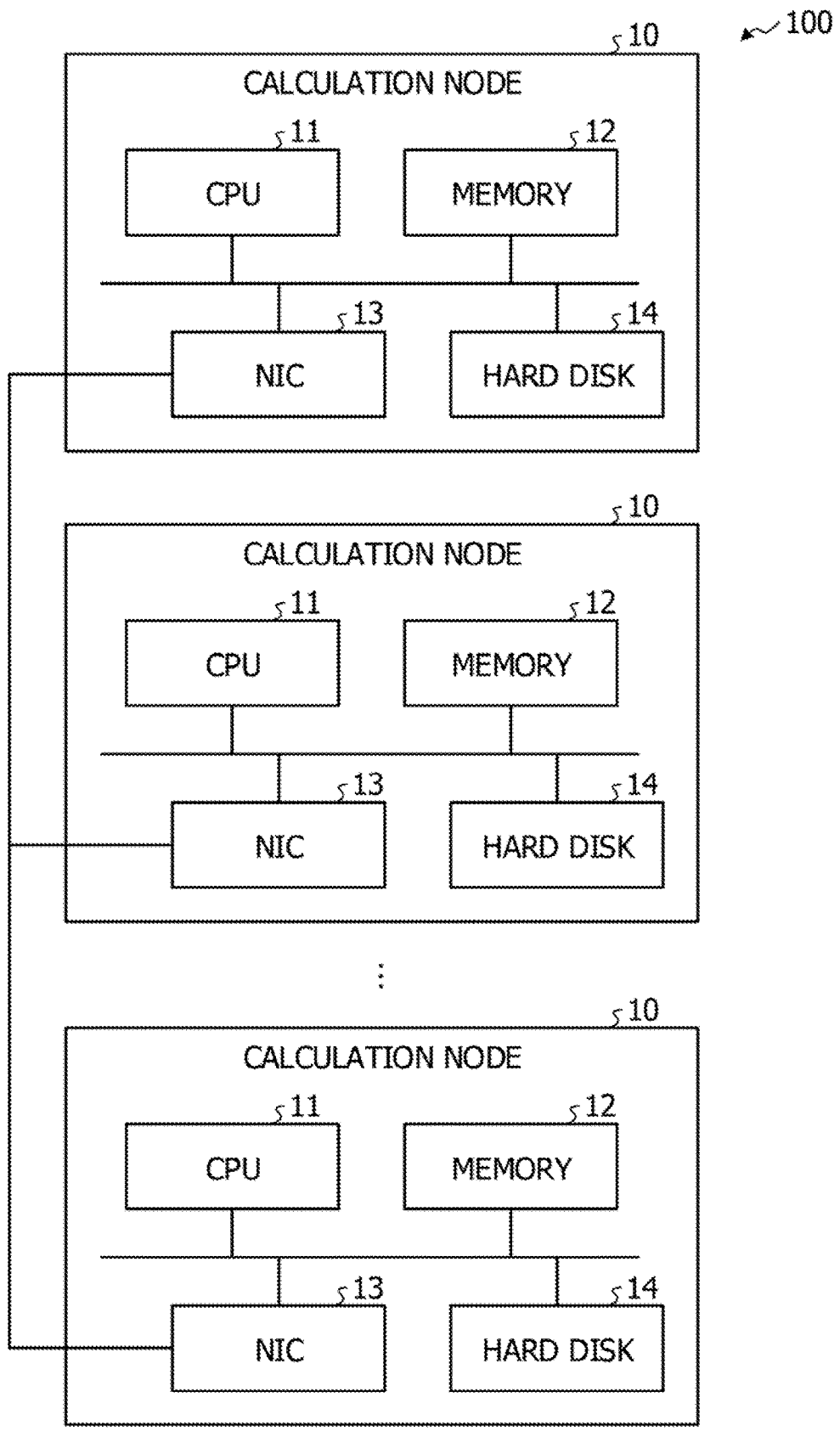
FIG. 1 is a diagram illustrating a hardware configuration of a parallel computer.

FIG. 1 is a diagram illustrating a hardware configuration of a parallel computer. A parallel computer 100 includes a plurality of calculation nodes 10. The parallel computer is an example of a computing control system.

Each calculation node 10 includes a central processing unit (CPU) 11, a memory 12, a network interface card (NIC) 13, and a hard disk 14. The CPU 11 is coupled to each of the memory 12, the NIC 13, and the hard disk 14 via a bus.

The NIC 13 is a communication device, and includes an interface for communication with the other calculation nodes 10. The calculation nodes 10 are coupled to one another via the NICs 13.

The hard disk 14 is an auxiliary storage device. The hard disk 14 has stored therein various programs including a program that includes a plurality of commands for performing calculations of a collective communication function using piggyback. The program that includes the plurality of commands for performing the calculations of the collective communication function using the piggyback is an example of a computing control program.

The memory 12 is a main storage device. The memory 12 has input data areas in which data used in the calculations of the collective communication function is stored. The memory 12 has, for example, two input data areas. In addition, the memory 12 has an area in which results obtained by executing the collective communication function are stored.

The CPU 11 is an arithmetic processing device, and implements a function of executing the collective communication function by reading the various programs including the program for executing the collective communication function from the hard disk 14, and loading and executing the programs on the memory 12. The CPU 11 stores different items of data used in the collective communication function in the two input data areas on the memory 12. Then, the CPU 11 combines the items of data stored in the two input data areas with each other, and, after execution of the collective communication function, acquires a result of a computation of the collective communication function using the combined data. Thereafter, the CPU 11 acquires, from the acquired computation result, results of computations of the collective communication function using the respective items of data stored in the two input data areas.

When the collective communication function is executed, one of the calculation nodes 10, for example, is a node that performs computation. The calculation node 10 that performs the computation receives data used in the collective communication function from each calculation node 10. At this time, the calculation node 10 that performs the computation receives, together with the data used in the computation, information regarding the content of the computation and a starting address, a data length, and an address of a storage destination of the data. Then, the calculation node 10 that performs the computation performs the specified computation using the acquired data in units of a specified number of bits. In the case where the specified computation is a 16-bit addition, for example, the calculation node 10 that performs the computation adds up 16-bit data items arranged at the same position in the items of data acquired from all the calculation nodes 10. Thereafter, the calculation node 10 that performs the computation transmits a result of the calculation to all the calculation nodes 10 from which, the data has been transmitted. Thus, the calculation node 10 that performs the computation performs the computation with the specified number of bits as a unit, and returns the computation result to each calculation node 10, without taking into account the content of data included in the received data.

Here, in the two input data areas on the memory 12, different items of data for which the collective communication function is executed separately are stored. Hereinafter, these items of data will be referred to as "first data" and "second data," respectively. The first data and the second data have different bit widths for the calculation of the collective communication function. For example, the bit width for the calculation of the first data is 32 bits, while the bit width for the calculation of the second data is 16 bits. Data having the bit width for the calculation included in the first data will be referred to as "first element data." Data having the bit width for the calculation included in the second data will be referred to as "second element data." The first data, is made up of a plurality of items of first element data put together. The second data is made up of a plurality of items of second element data put together. In the case where the calculation of the collective communication function is a computation for obtaining a sum total, for example, the sum total of items of first element data arranged at the same position in items of first data transmitted from all the calculation nodes 10 is calculated. The whole of each of the first data and the second data is referred to as a data area, and the data size thereof is referred to as an area size. The data size of each of the first element data and the second element data is referred to as an element size. The element sizes of the first element data and the second element data correspond to the bit widths for the calculation of the collective communication function of the first data and the second data, respectively.

Figure 2:
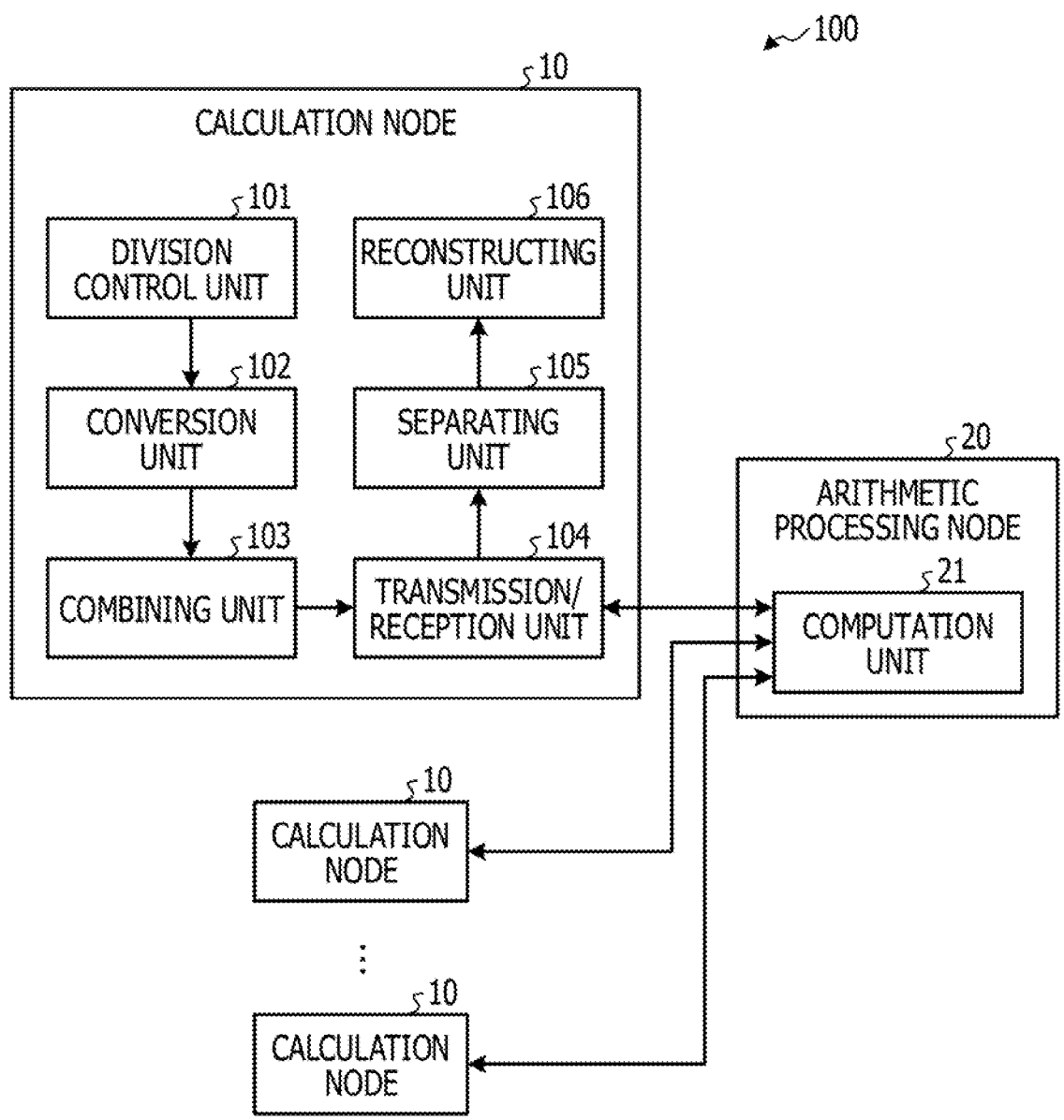
FIG. 2 is a block diagram illustrating functions of calculation nodes for executing a collective communication function.

Next, with reference to FIG. 2, exchange of data in the execution of the collective communication function according to the present embodiment will be described below. FIG. 2 is a block diagram illustrating functions of calculation nodes for executing a collective communication function. The calculation nodes 10 illustrated in FIG. 2 are the nodes other than the calculation node 10 that performs the computation, for example, the nodes that transmit the data used in the computation to the calculation node 10 that performs the computation. The calculation node 10 that performs the computation is represented as an arithmetic processing node 20 in FIG. 2.

Each calculation node 10 includes a division control unit 101, a conversion unit 102, a combining unit 103, a transmission/reception unit 104, a separating unit 105, and a reconstructing unit 106. While, in the following description, each unit is described as performing a process while holding data therein, in actuality, each unit performs the process on the data stored in the two input data areas on the memory 12.

Figure 3:
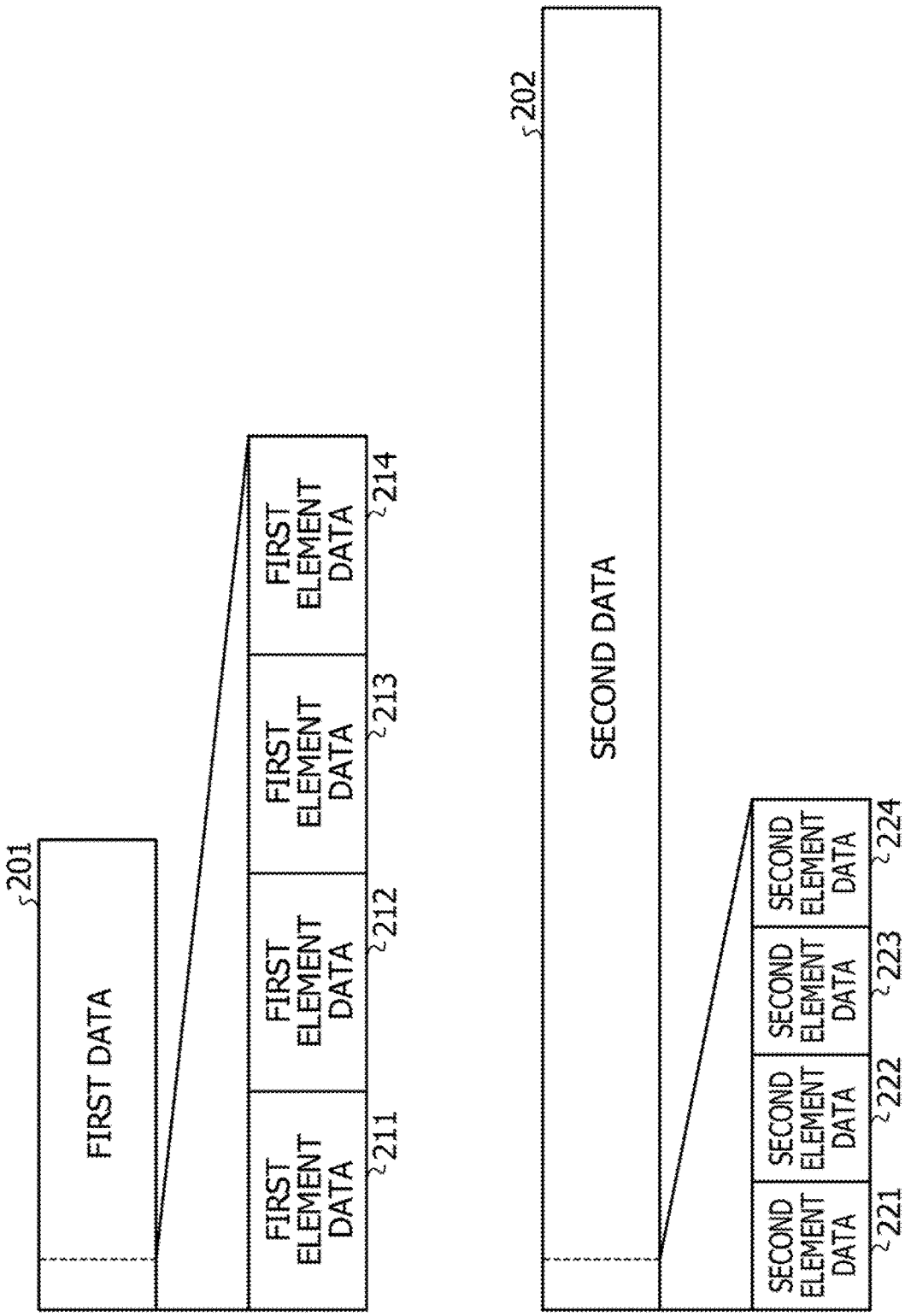
FIG. 3 is a diagram illustrating examples of two items of data used in calculation of a collective communication function.

The division control unit 101 compares the element size of the first element data with the element size of the second element data, and identifies the element data that has a greater element size. It is assumed in the following description that the element size of the first element data is greater than the element size of the second element data. For example, the first data and the second data used in the present embodiment are illustrated in FIG. 3. FIG. 3 is a diagram illustrating examples of two items of data used in calculation of a collective communication function. In FIG. 3, data 201 represents the first data. The plurality of items of first element data, including first element data 211, 212, 213, and 214, are included in the first data. Data 202 represents the second data. The plurality of items of second element data, including second element data 221, 222, 223, and 224, are included in the second data. The element size of each of the first element data 211 to 214 is greater than the element size of each of the second element data 221 to 224.

Next, the division control unit 101 determines whether or not the data area of the second data, which has a smaller element size, is significantly larger than the data area of the first data, which has a greater element size. Hereinafter, a condition in which the data area of the second data, which has a smaller element size, is significantly larger than the data area of the first data, which has a greater element size, will be referred to as a "division-recommended condition."

A criterion by which it is determined whether the data area of one of two data items is significantly larger than the data area of the other data item will be described below. One exemplary case in which the data area of one of the two data items is significantly larger than the data area of the other data item is a case in which adding a string of "0" bits to element data of the one of the two data items so as to make the element size of the element data equal to the element size of element data of the other data item would result in much data conversion and a large size of data to be transferred. For example, the case in which the data area of one of the two data items is, significantly larger than the data area of the other data item is a case in which an execution of the collective communication function with normal conversion would result in reduced processing efficiency. Consider, for example, the case where the area size of the first data, which has a greater element size, is in bytes, while the area size of the second data, which has a smaller element size, is in gigabytes. In this case, adding a string of "0" bits to the second element data so as to make the size thereof equal to the size of the first element data would result in an area size increase in gigabytes as well as an increase in gigabytes in the amount of data communication for the collective communication function. Such a case as this, for example, corresponds to the case where the data area of the second data is significantly larger than the data area of the first data. For example, it is preferable that the criterion by which a determination is made as to the division-recommended condition is determined in accordance with the element sizes and the area sizes of data items actually used in an operation.

For example, the criterion by which a determination is made as to the division-recommended condition will be described below. For example, when a difference between the data area of one of two data items and the data area of the other data item is greater than a given threshold value, the data area of one of the two data items is determined to be significantly larger than the data area of the other data item. Alternatively, when the data area of one of two data items is given times the data area of the other data item or larger, the data area of the one of the two data items may be determined to be significantly larger than the data area of the other data item. A difference in data area that causes the data area of one of two data items to be determined to be significantly larger than the data area of the other data item, such as when the difference in data area is by a factor of a given number or more or by a given data size or more as described above, corresponds to an example of "the difference between the data area of one of two data items and the data area of the other data item being greater by a given value or more." For example, FIG. 3 represents a condition in which the area size of the second data is significantly greater than the area size of the first data, which corresponds to the division recommended condition.

When the division-recommended condition is absent, the division control unit 101 instructs the conversion unit 102 to perform a process of adding a string of "0" bits to the second element data, which has a smaller element size, so as to make the element size thereof equal to the element size of the first element data.

In contrast, when the division-recommended condition is present, the division control unit 101 determines whether or not an overflow and an underflow are avoidable when the computation is performed from the type of the computation to be performed, the data size of segment data resulting from a division, and the element size of the second element data. The overflow here refers to a case in which a calculation result has a value at a place higher than the highest place of data obtained by adding a string of "0" bits to the segment data resulting from the division. The underflow here refers to a case in which a calculation result has a value at a place lower than the lowest place of the data obtained by adding a string of "0" bits to the segment data resulting from the division. In the present embodiment, an additional correction is not made to the segment data resulting from the division, and therefore, the division control unit 101 determines whether or not an overflow and an underflow are avoidable depending on whether or not an overflow or an underflow will occur when a calculation is performed using the segment data resulting from the division.

In the case where an overflow or an underflow will occur, the division control unit 101 determines that the calculation of the collective communication function is difficult with the division of the first element data. Then, the division control unit 101 instructs the conversion unit 102 to perform a process of adding a string of "0" bits to the second element data, which has a smaller element size, so as to make the element size thereof equal to the element size of the first element data.

Figure 4:
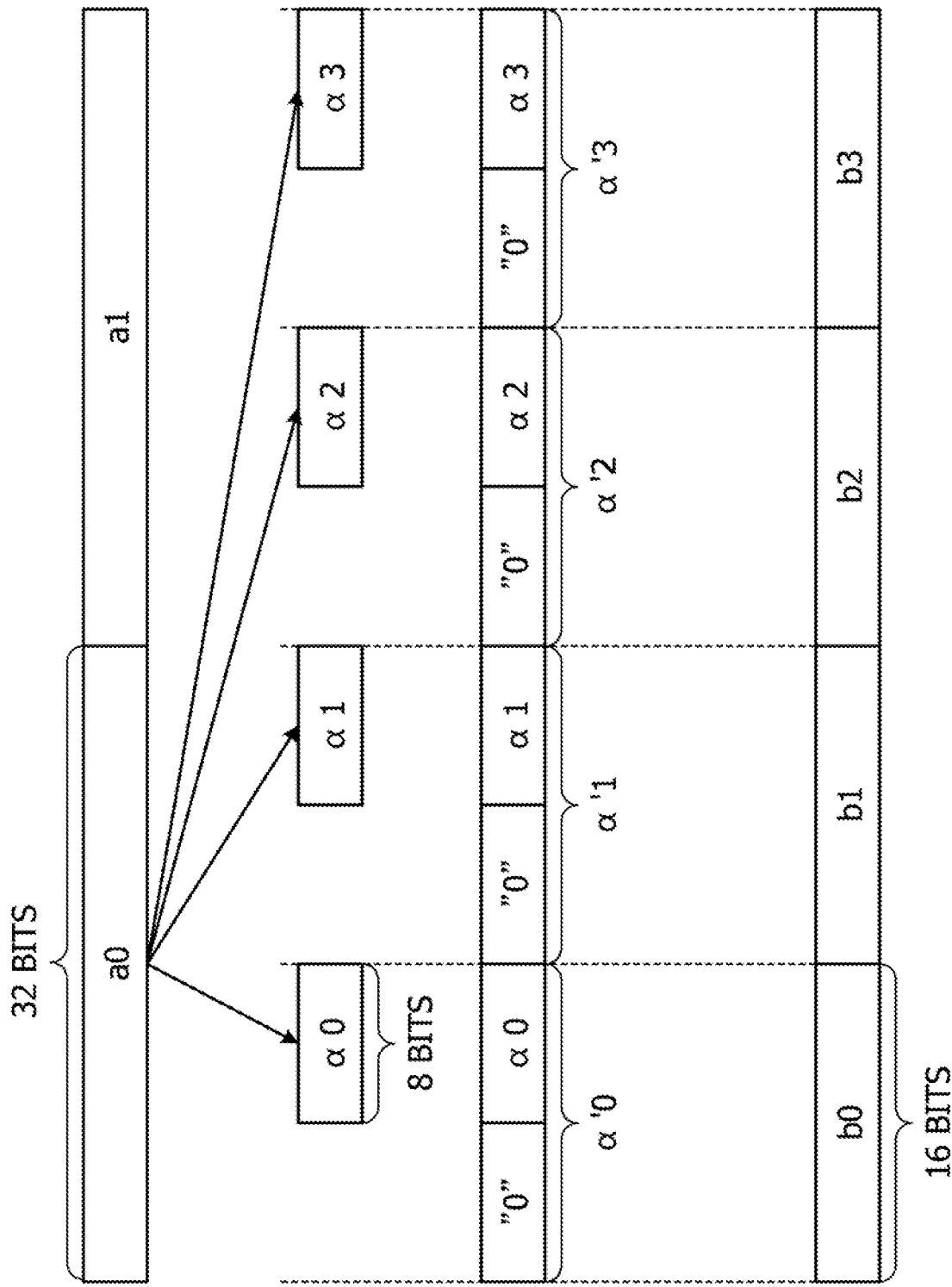
FIG. 4 is a diagram for explaining generation of segment data and extended data.

In contrast, in the case where neither an overflow nor an underflow will occur, the division control unit 101 divides the first element data into items of segment data, each item of segment data having a size smaller than that of the second element data. FIG. 4 is a diagram for explaining generation of segment data and extended data. Here, the division control unit 101 divides first element data a0 into four items of segment data α0 to α3 as illustrated in FIG. 4. The element size of the first element data is defined as N, the data size of the segment data is defined as N', and the place of each item of segment data in an order in which the items of segment data are arranged is defined as k. In the case where the element size of the first element data a0 is 32 bits, for example, the data size of each of the segment data α0 to α3 is 8 bits. In this case, N=32, N'=8, and k is an integer that satisfies 0≤k≤3.

Then, the division control unit 101 instructs the conversion unit 102 to convert each segment data so as to have a data size equal to that of the second element data. It is preferable that the size of each item of segment data obtained by the division is determined such that the calculation of the collective communication function using data obtained by adding a string of "0" bits to the segment data and thus converting the segment data so as to, have a data size equal to the element size of the second element data will not allow the data size of resulting data to exceed the element size of the second element data.

The conversion unit 102 receives an instruction to add a string of "0" bits from the division control unit 101. In the case where this is an instruction to add a string of "0" bits to the second element data, which has a smaller element size, to convert the second element data so as to have a data size equal to the element size of the first element data, the conversion unit 102 adds a string of "0" bits to the second element data, and thus generates extended data. At this time, the conversion unit 102 causes the data size of the extended data to coincide with the element size of the first element data. In the present embodiment, the conversion unit 102 adds the string of "0" bits on a top side of the second element data, at higher places.

Then, the conversion unit 102 instructs the combining unit 103 to combine the first element data and the extended data together. Further, the conversion unit 102 notifies the combining unit 103 that a selected conversion mode is that of normal conversion, in which the string of "0" bits is added to the second element data, which has a smaller element size, without a dividing operation. The extended data generated at this time corresponds to an example of "second extended data."

In contrast, in the case of an instruction to add a string of "0" bits to the segment data to convert the segment data so as to have a data size equal to the element size of the second element data, the conversion unit 102 adds a string of "0" bits to the segment data, and thus generates extended data. At this time, the conversion unit 102 causes the data size of the extended data to coincide with the element size of the second element data. In this case also, in the present embodiment, the conversion unit 102 adds the string of "0" bits on a top side of the segment data, i.e., at higher places. The extended data generated at this time corresponds to an example of "first extended data."

For example, in the case where the element size of second element data b0 to b3 is 16 bits as illustrated in FIG. 4, the conversion unit 102 adds a string of eight "0" bits to the segment data α0, and thus generates extended data α'0 having a data size equal to the element size of the second element data. Similarly, the conversion unit 102 adds a string of eight "0" bits to each of the segment data α1 to α3, and thus generates extended data α'1 to α'3 each having a data size equal to the element size of the second element data b1 to b3.

Thereafter, the conversion unit 102 instructs the combining unit 103 to combine the extended data and the second element data together. Further, the conversion unit 102 notifies the combining unit 103 that the selected conversion mode is that of dividing conversion, in which the first element data, which has a greater element size, is divided before the addition of a string of "0" bits is performed.

The combining unit 103 receives an instruction to generate combination data from the division control unit 101. When instructed to combine the first element data and the extended data of the second element data together, the combining unit 103 combines the first element data and the extended data of the second element data together to generate the combination data. Here, the combining unit 103 performs the combination by arranging the two items of data so as to form one item of data. Here, the combining unit 103 places the extended data of the second element data behind the first element data. Further, the combining unit 103 adds, to the combination data, information indicating the normal conversion as conversion mode information. Then, the combining unit 103 instructs the transmission/reception unit 104 to transmit the generated combination data.

In contrast, when instructed to combine the second element data and the extended data of the segment data together, the combining unit 103 combines the second element data and the extended data of the segment data together to generate the combination data. In the case of the extended data α'0 to α'3 as illustrated in FIG. 4, for example, the combining unit 103 combines the extended data α'0 to α'3 with the second element data b0 to b3, respectively, to generate respective items of combination data. Here, the combining unit 103 places the second element data behind the extended data of the segment data. Further, the combining unit 103 adds, to the combination data, information indicating the dividing conversion as conversion mode information. Then, the combining unit 103 instructs the transmission/reception unit 104 to transmit the generated combination data.

The transmission/reception unit 104 receives the instruction to transmit the combination data from the combining unit 103. Then, the transmission/reception unit 104 notifies the arithmetic processing node 20 of information regarding the computation to be performed, and a starting address, a data length, and an address of a storage destination of the combination data, and transmits the combination data to the arithmetic processing node 20 using direct memory access (DMA).

Thereafter, the transmission/reception unit 104 receives, from the arithmetic processing node 20, a result of calculation of the collective communication function using the transmitted combination data. Then, the transmission/reception unit 104 outputs the acquired calculation result to the separating unit 105. This calculation result has the conversion mode information added thereto.

The separating unit 105 receives the input of the calculation result of the combination data from the transmission/reception unit 104. Then, the separating unit 105 checks the conversion mode information added to the calculation result.

In the case where the conversion mode is the normal conversion, the separating unit 105 divides the calculation result into two parts each having a size equal to the element size of the first element data. As a result, the separating unit 105 acquires a result of calculation of the collective communication function using the first element data, and a result of calculation of the collective communication function using the extended data, of the second element data. Then, the separating unit 105 outputs, to the reconstructing unit 106, the result of calculation of the collective communication function using the extended data of the second element data together with a report that the conversion mode is the normal conversion.

In contrast, in the case where the conversion mode is the dividing conversion, the separating unit 105 divides the calculation result into two parts each having a size equal to the element size of the second element data. As a result, the separating unit 105 acquires a result of calculation of the collective communication function using the extended data of the segment data, and a result of calculation of the collective communication function using the second element data. Then, the separating unit 105 outputs, to the reconstructing unit 106, the result of calculation of the collective communication function using the extended data of the segment data together with a report that the conversion mode is the dividing conversion.

In the case of the normal conversion, the reconstructing unit 106 receives, from the separating unit 105, the input of the result of calculation of the collective communication function using the extended data of the second element data. Then, the reconstructing unit 106 eliminates, from the calculation result, a string of "0" bits at the top of the calculation result, i.e., at the highest places of the calculation result, to reconstruct and acquire a result of calculation of the collective communication function using the second element data.

In contrast, in the case of the dividing conversion, the reconstructing unit 106 receives, from the separating unit 105, the input of the result of calculation of the collective communication function using the extended data of the segment data. The reconstructing unit 106 collects results of calculation using the extended data of the items of segment data generated by dividing one item of first element data. Next, the reconstructing unit 106 complements each of the collected calculation results by adding a string of "0" bits in front of and/or behind the calculation result to generate complemented data having a size equal to the size of the first element data.

Here, the complemented data is generated in a manner described below, for example. The reconstructing unit 106 arranges each calculation result such that the size of a region from an end of the calculation result to an end of the complemented data will be $\{N-N' \times (k+1)\}$, and adds a string of "0" bits at a region other than the region of the calculation result to generate the complemented data.

Here, when the segment data is represented as data ak, the first element data a0 and the segment data ak satisfy the following equation (1).

$$a0 = \sum_{k=0}^{\left(\frac{N'}{N}-1\right)} \alpha k \times 2^{\{N-N' \times (k+1)\}} \quad (1)$$

In the present embodiment, N=32, N'=8, and k is an integer satisfying $0 \leq k \leq 3$, and therefore, $\alpha 0 = \alpha 0 \times 2^{24} + \alpha 1 \times 2^{16} + \alpha 2 \times 2^{8} + \alpha 3 \times 2^{0}$.

Then, the reconstructing unit 106 adds up the items of complemented data obtained by complementing the collected calculation results to acquire a result of calculation of the collective communication function with respect to the first element data. The reconstructing unit 106 acquires the results of calculation of the collective communication function with respect to all items of first element data included in the first data in the manner as described above, and arranges the acquired calculation results in a proper order to acquire a result of calculation of the collective communication function with respect to the first data.

Figure 5:
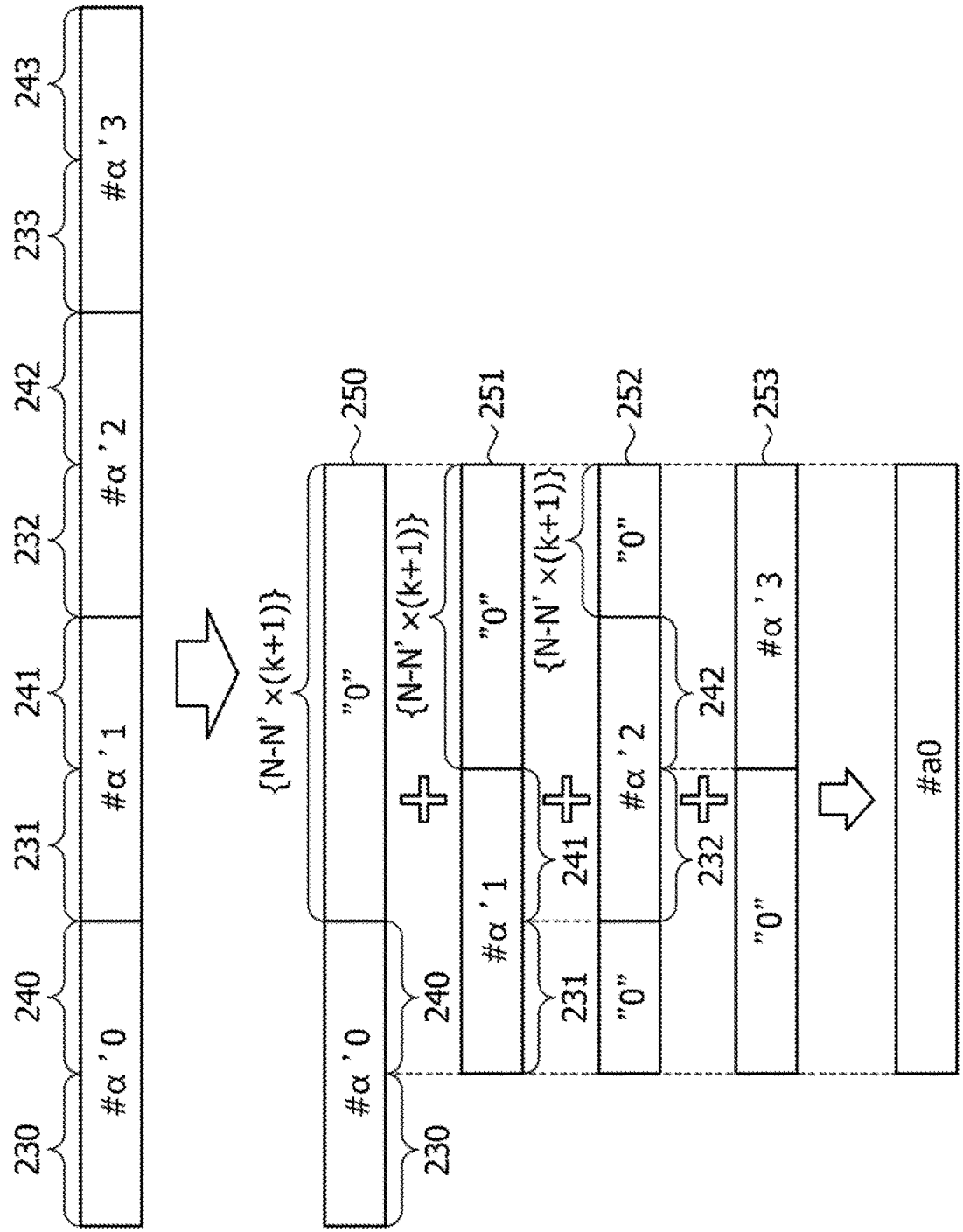
FIG. 5 is a diagram for explaining reconstruction of data according to Embodiment 1.

FIG. 5 is a diagram for explaining reconstruction of data according to Embodiment 1. Here, the case where one item of first element data a0 is divided into four parts to generate four items of segment data α0 to α3 will be described. In FIG. 5, results of calculation of the collective communication function using the extended data α'0 to α'3 of the segment data α0 to α3, respectively, are represented as data #α'0 to #α'3, respectively. The data #α'0 to #α'3 are equal in data size to the extended data α'0 to α'3.

The reconstructing unit 106 arranges the data #α'0 such that the size of a region from an end of the data #α'0 to an end of complemented data 250 will be {N−N'×(k+1)}= {(32−8×(0+1)}=24 bits. The reconstructing unit 106 arranges the data #α'1 such that the size of a region from an end of the data #α'1 to an end of complemented data 251 will be {N−N'×(k+1)}={32−8×(1+1)}=16 bits. The reconstructing unit 106 arranges the data #α'2 such that the size of a region from an end of the data #α'2 to an end of complemented data 252 will be {N−N'×(k+1)}={32−8×(2+1)}=8 bits. The reconstructing unit 106 arranges the data #α'3 such that the size of a region from an end of the data #α'3 to an end of complemented data 253 will be {N−N'×(k+1)}={32−8×(3+1)}=0 bits.

Thereafter, the reconstructing unit 106 adds a string of "0" bits in front of and/or behind each of the data #α'0 to #α'3 such that the data size of each will be equal to the size of the first element data. In this manner, the reconstructing unit 106 generates the data 250 to 253.

Thereafter, the reconstructing unit 106 adds up the data 250 to 253 to calculate data #a0, which corresponds to a calculation result of the first element data a0. Here, the bit width for the calculation of the collective communication function using the first data corresponds to the element size of the first element data, and digits that exceed the element size of the first element data are overflow digits, and are not included in the calculation result. Therefore, the reconstructing unit 106 may obtain the data #a0 as data having a size equal to the element size of the first element data a0.

When the result of calculation of the collective communication function is represented as data #α'k, and the calculation result of the first element data a0 is represented as the data #a0, the data #a0 and the data #α'k satisfy the following equation (2).

$$\#a0 = \sum_{k=0}^{\left(\frac{N'}{N}-1\right)} \#\alpha'k \times 2^{[N-N'\times(k+1)]} \quad (2)$$

The reconstructing unit 106 generates the complemented data, which corresponds to each term on the right side of the equation (2), and calculates the sum of the items of complemented data to acquire #a0, which corresponds to the calculation result on the left side of the equation (2). Accordingly, the reconstructing unit 106 arranges the data #α'k such that the size of the region from the end of each calculation result to the end of the complemented data will be {N−n'×(k+1)} as illustrated in FIG. 5.

The functions of the division control unit 101, the conversion unit 102, the combining unit 103, the transmission/reception unit 104, the separating unit 105, and the reconstructing unit 106 as described above are implemented by the CPU 11 illustrated in FIG. 1 loading the program that includes the plurality of commands for executing the collective communication function into the memory 12 and executing the program. The transmission and reception of data by the transmission/reception unit 104 are performed via the NIC 13.

Reference is made back to FIG. 2. The arithmetic processing node 20 includes a computation unit 21. The computation unit 21 receives the input of data from each calculation node 10. Then, the computation unit 21 performs the calculation of the collective communication function using the inputted data. Thereafter, the computation unit 21 transmits a result of the calculation to the calculation node 10 from which the data used in the calculation has been inputted. The above functions of the computation unit 21 are implemented by the CPU 11 executing a program.

Figure 6:
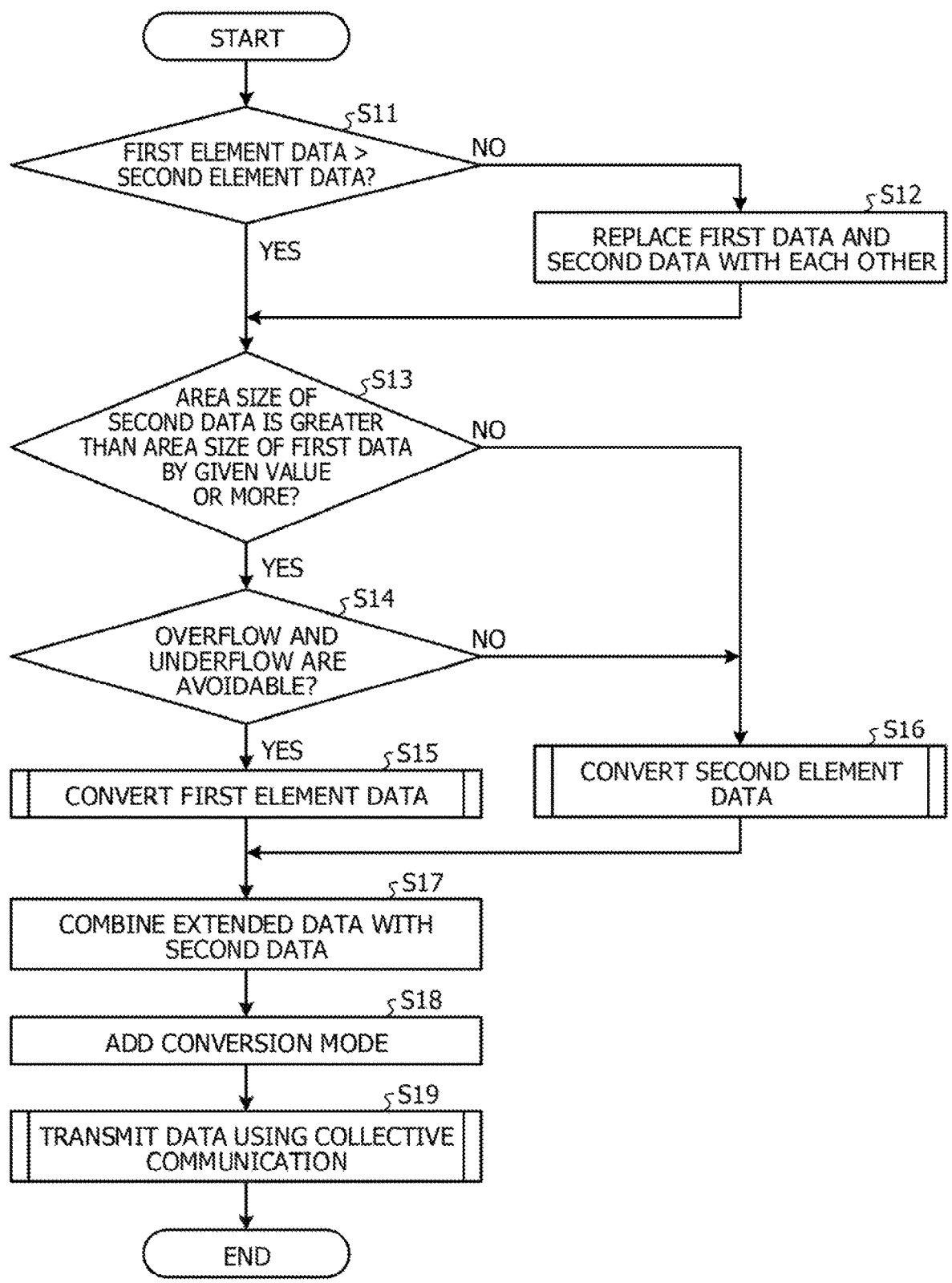
FIG. 6 is a flowchart of a data transmission process performed when a collective communication function is executed.

Next, with reference to FIG. 6, a procedure of a data transmission process performed when the collective communication function is executed will be described below. FIG. 6 is a flowchart of the data transmission process performed when a collective communication function is executed. It is assumed in the following description that the memory 12 has a first data area and a second data area, and data stored in the first data area is the first data while data stored in the second data area is the second data.

The division control unit 101 determines whether or not the element size of the first element data included in the first data is greater than the element size of the second element data included in the second data (step S11). If the element size of the first element data is greater than the element size of the second element data (Yes at step S11), the division control unit 101 proceeds to step S13.

In contrast, if the element size of the first element data is equal to or smaller than the element size of the second element data (No at step S11), the division control unit 101 replaces the data stored in the first data area and the data stored in the second data area with each other (step S12).

Next, the division control unit 101 determines whether or not the area size of the second data is greater than the area size of the first data by a given value or more (step S13).

If the area size of the second data is greater than the area size of the first data by the given value or more (Yes at step S13), the division control unit 101 determines whether or not an overflow and an underflow will be avoidable when the first element data is divided for calculation (step S14).

If an overflow and an underflow will be avoidable (Yes at step S14), the division control unit 101 determines to perform the dividing conversion. Then, the division control unit 101 and the conversion unit 102 convert the first element data (step S15).

Meanwhile, if the area size of the second data is not greater than the area size of the first data by the given value or more (No at step S13), or if an overflow or an underflow is expected to occur (No at step S14), the division control unit 101 determines to perform normal conversion. Then, the division control unit 101 and the conversion unit 102 convert the second element data (step S16).

Thereafter, the combining unit 103 combines the extended data generated from the first element data with the second data to generate the combination data (step S17).

Further, the combining unit 103 adds the information regarding the conversion mode to the generated combination data (step S18).

Thereafter, the combining unit 103 outputs the combination data to the transmission/reception unit 104. The transmission/reception unit 104 transmits the combination data inputted from the combining unit 103 to the arithmetic processing node 20 using collective communication (step S19).

Figure 7:
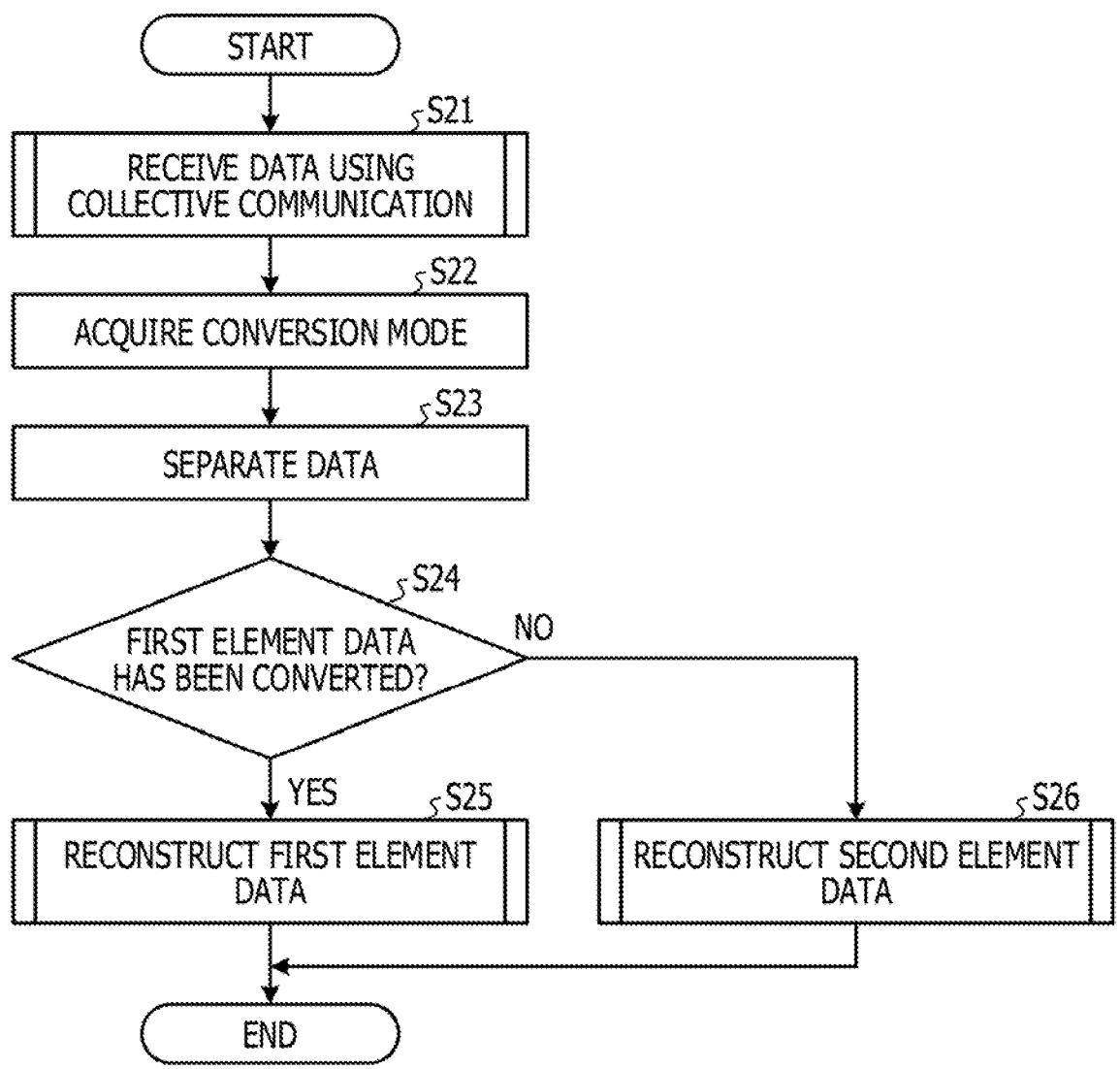
FIG. 7 is a flowchart of a data reception process performed when a collective communication function is executed.

Next, with reference to FIG. 7, a procedure of a data reception process performed when the collective communication function is executed will be described below. FIG. 7 is a flowchart of a data reception process performed when a collective communication function is executed. It is assumed in the following description that the first element data is greater than the second element data in the element size.

The transmission/reception unit 104 receives, from the arithmetic processing node 20, a result of calculation of the collective communication function using the combination data transmitted using the collective, communication (step S21). Then, the transmission/reception unit 104 outputs the received calculation result to the separating unit 105.

The separating unit 105 receives the input of the calculation result from the transmission/reception unit 104. Next, the separating unit 105 checks the information regarding the conversion mode added to the calculation result, and thus acquires the conversion mode used for the calculation of the collective communication function (step S22).

Next, the separating unit 105 divides data of the calculation result into two equal parts to obtain two separate data items (step S23).

Next, the separating unit 105 determines which of the first element data and the second element data has been converted from the acquired conversion mode (step S24). For example, the separating unit 105 determines that the first element data has been converted in the case where the conversion mode is the dividing conversion, and determines that the second element data has been converted in the case where the conversion mode is the normal conversion.

In the case where the first element data has been converted (Yes at step S24), the separating unit 105 instructs the reconstructing unit 106 to reconstruct the first element data subjected to the dividing conversion. Then, the reconstructing unit 106 performs a process of reconstructing the first element data subjected to the dividing conversion (step S25).

In contrast, in the case where the second element data has been converted (No at step S24) the separating unit 105 instructs the reconstructing unit 106 to reconstruct the second element data subjected to the normal conversion. Then, the reconstructing unit 106 performs a process of reconstructing the second element data subjected to the normal conversion (step S26).

As described above, in each of the calculation nodes of the parallel computer according to the present embodiment, it is determined whether or not a reduction in processing performance will occur if the collective communication function is executed after data having a smaller element size is converted so as to have a size equal to the size of data having a greater element size and the converted data is combined with the data having a greater element size. Then, if a reduction in processing performance is expected to occur, each calculation node divides the data having a greater element size into items of segment data, converts each item of segment data so as to have a size equal to the size of the data having a smaller element size, and combines the converted segment data with the data having a smaller element size before the execution of the collective communication function. Thus, a reduction in processing required for data conversion may be achieved, and a reduction in the amount of data that is transmitted and received in the collective communication may be achieved, resulting in an improvement in the processing performance of the parallel computer according to the present embodiment.

Next, Embodiment 2 will be described below. Each of calculation nodes of a parallel computer according to the present embodiment is different from the calculation node according to Embodiment 1 in, when there is a possibility that an underflow will occur, subjecting data to conversion for avoiding an occurrence of an underflow before a calculation using a collective communication function is performed. The calculation nodes according to the present embodiment are also represented by the block diagram of FIG. 2. In the following description, descriptions of functions of the units that are shared with Embodiment 1 will be omitted.

The division control unit 101 determines whether or not first data and second data used in the calculation of the collective communication function are in the division-recommended condition. If the first data and the second data are in the division-recommended condition, the division control unit 101 determines whether or not an overflow and an underflow are avoidable. In the present embodiment, the division control unit 101 determines that an overflow and an underflow are avoidable when the calculation of the collective communication function is an addition, a subtraction, or a computation for obtaining an average of all, for example. Then, when an overflow and an underflow are avoidable, the division control unit 101 divides the first element data, which has a greater element size, into items of segment data, each item of segment data having a size smaller than that of the second element data. Then, the division control unit 101 instructs the conversion unit 102 to convert each segment data so as to have a data size equal to that of the second element data.

When an instruction to convert the segment data so as to have a data size equal to that of the second element data is received from the division control unit 101, the conversion unit 102 determines whether or not there is a possibility that an underflow will occur. When there is a possibility that an underflow will occur, the conversion unit 102 converts the segment data to a value that will not allow an underflow to occur, thus generating converted data. This process of converting the segment data to a value that will not allow an underflow to occur corresponds to an example of a "given process." The conversion unit 102 adds a string of "0" bits to the generated converted data, thus generating extended data having a data size equal to the element size of the second element data. Thereafter, the conversion unit 102 outputs the generated extended data to the transmission/reception unit 104.

Figure 8:
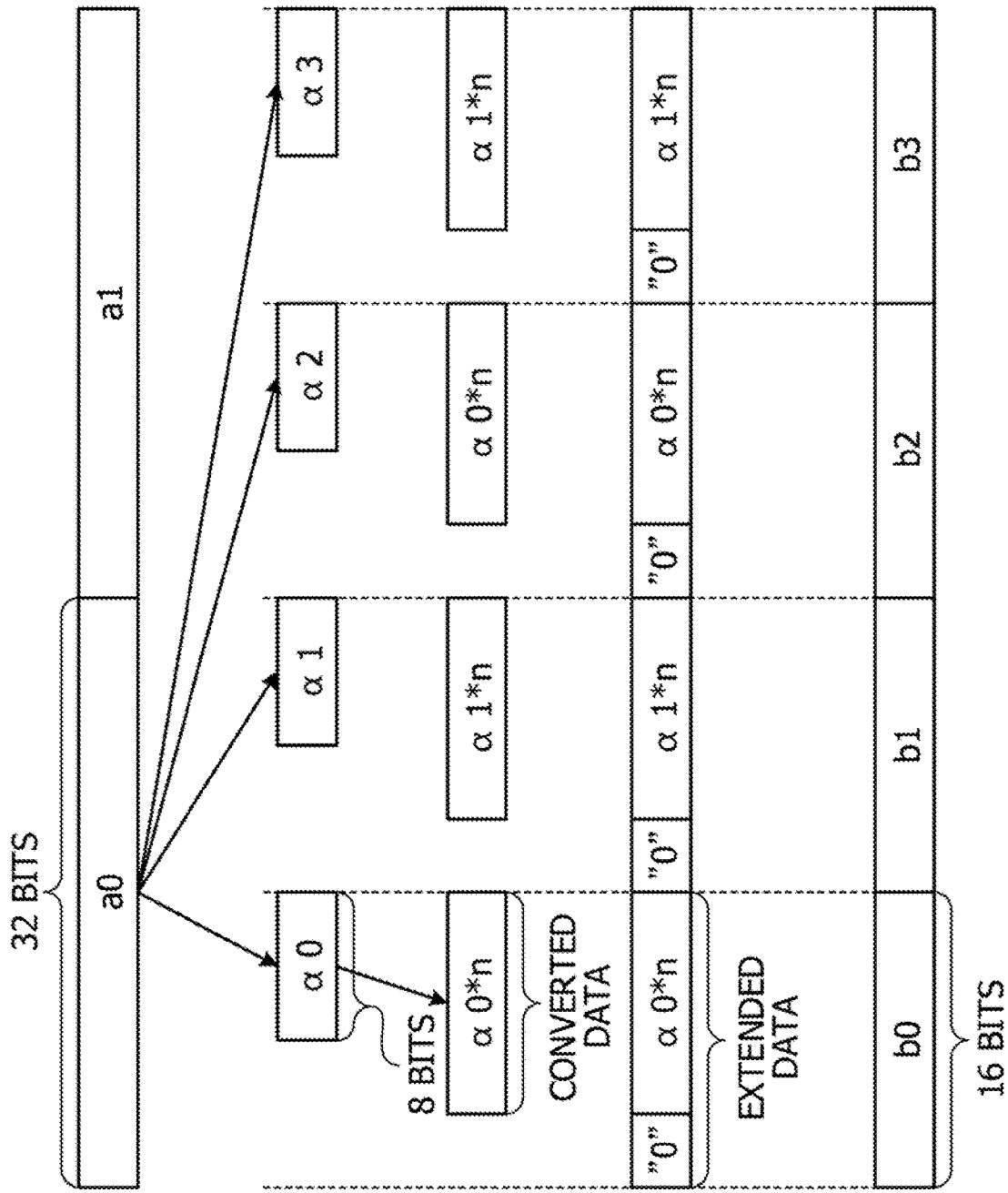
FIG. 8 is a diagram for explaining data conversion for avoiding an occurrence of an underflow.

Here, with reference to FIG. 8, data conversion for avoiding an occurrence of an underflow will be described below assuming, by way of example, that the calculation of the collective communication function is a computation for obtaining the average. FIG. 8 is a diagram for explaining data conversion for avoiding an occurrence of an underflow. It is assumed in the following description that the number of calculation nodes 10 that perform calculations using the collective communication function is n.

The conversion unit 102 receives, from the division control unit 101, segment data $\alpha 0$ to $\alpha 3$ obtained by dividing first element data a0. Then, the conversion unit 102 determines that there is a possibility that an underflow will occur from the fact that the calculation of the collective communication function is a computation for obtaining the average of n items of data. Then, the conversion unit 102 generates converted data by multiplying each of the segment data $\alpha 0$ to $\alpha 3$ by n. In FIG. 8, the multiplication of each of the segment data $\alpha 0$ to $\alpha 3$ by n is represented by the symbol of each of the segment data $\alpha 0$ to $\alpha 3$ being multiplied by n.

Further, the conversion unit 102 adds a string of "0" bits to the generated converted data, and thus generates extended data having a data size equal to the element size of each of second element data b0 to b3.

Because the computation for obtaining the average of the n items of data does not produce a value greater than that of any data prior to the calculation, the calculation of the collective communication function using the generated converted data does not cause an overflow. In addition, although the computation for obtaining the average of the n items of data involves a division by n, the division by n does not cause an underflow because the converted data has originally been obtained by the multiplication by n. Thus, neither an overflow nor an underflow will occur when the calculation of the collective communication function for obtaining the average of the n items of data is performed using the converted data generated by the conversion unit 102.

The reconstructing unit 106 receives, from the separating unit 105, the input of a result of calculation of the collective communication function using the extended data generated from the converted data together with a report that the conversion mode is the dividing conversion. The reconstructing unit 106 collects results of calculation using the extended data generated from the items of segment data generated by dividing one item of first element data. Next, the reconstructing unit 106 complements each of the collected calculation results by adding a string of "0" bits in front of and/or behind the calculation result to generate complemented data having a size equal to the size of the first element data multiplied by n. The size of the complemented data is, for example, {N+cell(log$_2$n)}. Here, cell(x) means the smallest integer equal to or greater than x.

The complemented data is generated in, a manner described below, for example. The reconstructing unit 106 arranges each calculation result such that the size of a region from an end of the calculation result to an end of the complemented data will be {N−N'×(k+1)}, and adds a string of "0" bits at a region other than the region of the calculation result to generate the complemented data.

Next, the reconstructing unit 106 adds up the items of complemented data obtained by complementing the collected calculation results to acquire a value obtained by multiplying a result of calculation of the collective communication function with respect to the first element data by n. Then, the reconstructing unit 106 divides the acquired value by n to acquire the result of calculation of the collective communication function with respect to the first element data. The reconstructing unit 106 acquires the results of calculation of the collective communication function with respect to all items of first element data included in the first data in the manner as described above, and arranges the acquired calculation results in a proper order to acquire a result of calculation of the collective communication function with respect to the first data.

Figure 9:
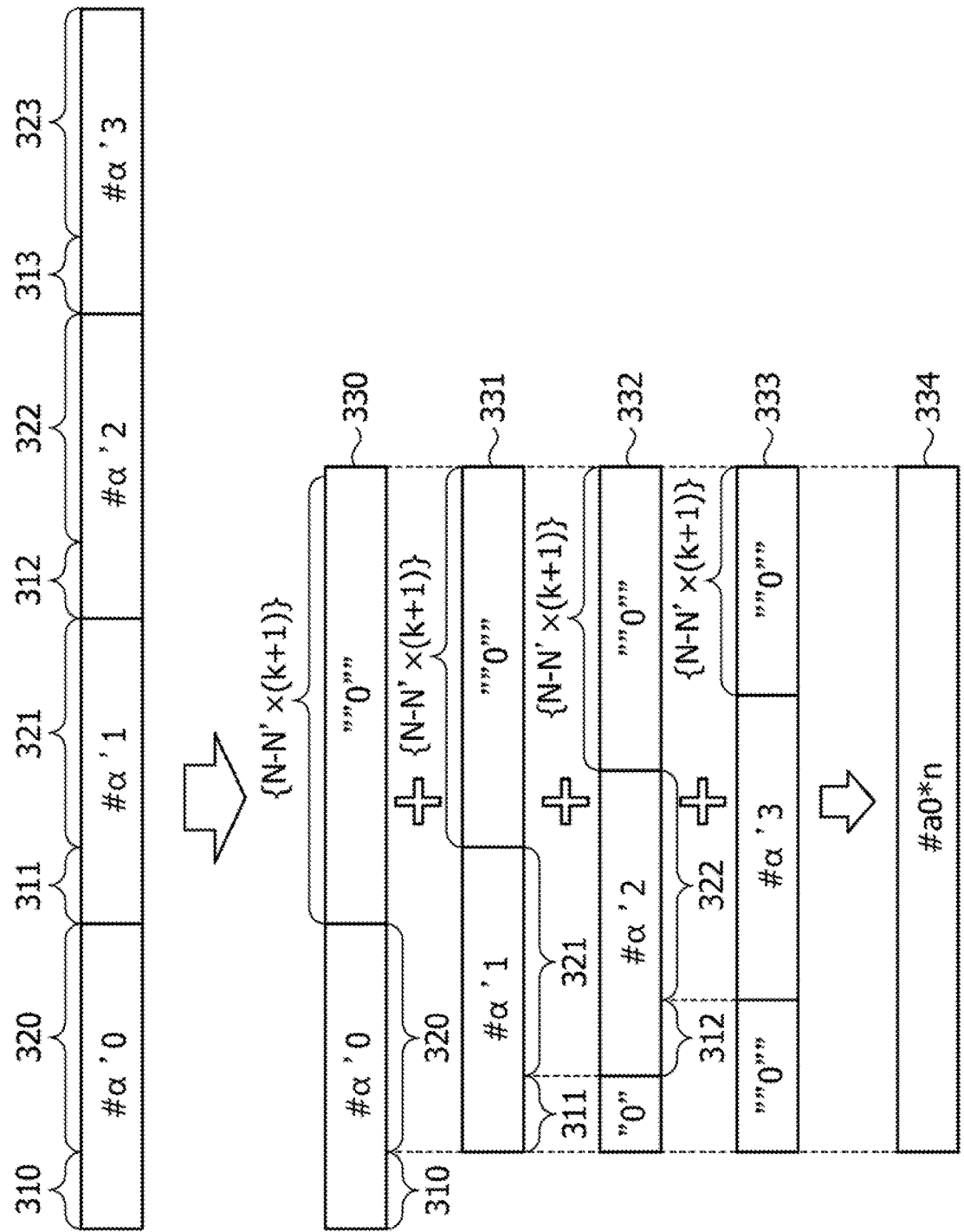
FIG. 9 is a diagram for explaining reconstruction of data according to Embodiment 2.

FIG. 9 is a diagram for explaining reconstruction of data according to Embodiment 2. Here, the case where one item of first element data a0 is divided into four parts to generate four items of segment data α0 to α3 will be described. In FIG. 9, results of calculation of the collective communication function using the extended data α'0 to α'3 generated from the converted data obtained by multiplying the segment data α0 to α3, respectively, by n are represented as data #α'0 to #α'3, respectively. The data #α'0 to #α'3 are equal in data size to the extended data α'0 to α'3.

The reconstructing unit 106 arranges the data #α'0 such that the size of a region from an end of the data #α'0 to an end of complemented data 330 will be {N−N'×(k+1)}={32−8×(0+1)}=24 bits. The reconstructing unit 106 arranges the data #α'1 such that the size of a region from an end of the data #α'1 to an end of complemented data 331 will be {N−N'×(k+1)}={32−8×(1+1)}=16 bits. The reconstructing unit 106 arranges the data #α'2 such that the size of a region from an end of the data #α'2 to an end of complemented data 332 will be {N−N'×(k+1)}={32−8×(2+1)}=8 bits. The reconstructing unit 106 arranges the data #α'3 such that the size of a region from an end of the data #α'3 to an end of complemented data 333 will be {N−N'×(k+1)}={32−8×(3+1)}=0 bits.

Thereafter, the reconstructing unit 106 adds a string of "0" bits in front of and/or behind each of the data #α'0 to #α'3 such that the data size of each will be equal to the size of the first element data multiplied by n. In this manner, the reconstructing unit 106 generates the data 330 to 333.

Thereafter, the reconstructing unit 106 adds up the data 330 to 333 to calculate data 334, which represents a value obtained by multiplying a calculation result of the first element data a0 by n. In FIG. 9, "#a0*n" indicates that the data 334 represents the "value obtained by multiplying the calculation result of the first element data a0 by n." Then, the reconstructing unit 106 divides the data 334 by n, and thus acquires the calculation result of the first element data a0.

When the result of calculation of the collective communication function is represented as data #α'k, and the calculation result of the first element data a0 is represented as the data #a0, the data #a0 and the data #α'k satisfy the following equation (3).

$$\#a0 \times n = \sum_{k=0}^{\left(\frac{N'}{N}-1\right)} \#\alpha'k \times 2^{\{N-N' \times (k+1)\}} \quad (3)$$

The reconstructing unit 106 generates the complemented data, which corresponds to each term on the right side of the equation (3), and calculates the sum of the items of complemented data to acquire #a0×n, which corresponds to the calculation result on the left side of the equation (3). Accordingly, the reconstructing unit 106 arranges the data #α'k, which corresponds to each calculation result, such that the size of the region from the end of the calculation result to the end of the complemented data will be {N−N'×(k+1)} as illustrated in FIG. 9.

The present embodiment is different from Embodiment 1 in the size of the complemented data. In contrast to the equation (2) in Embodiment 1, both sides of the equation (3) in the present embodiment include the multiplication by n, which is the number of calculation nodes. Accordingly, the size of the complemented data in the present embodiment is not N but {N+cell(log$_2$n)}.

The functions of the division control unit 101, the conversion unit 102, and the reconstructing unit 106 as described above are also implemented by the CPU 11 illustrated in FIG. 1 loading a program for executing the collective communication function into the memory 12 and executing the program.

Next, with reference to FIG. 10, a procedure of the process of generating the extended data according to Embodiment 2 will be described below. FIG. 10 is a flowchart of a process of generating extended data according to Embodiment 2.

When an underflow and n overflow are avoidable, the division control unit 101 determines to perform dividing conversion that involves dividing the first element data.

Then, the division control unit 101 generates the segment data by dividing the first element data (step S101). Thereafter, the division control unit 101 instructs the conversion unit 102 to convert the segment data.

The conversion unit 102 receives an instruction to convert the segment data from the division control unit 101. Then, the conversion unit 102 determines whether or not there is a possibility that an underflow will occur (step S102). If there is no possibility that an underflow will occur (No at step S102), the conversion unit 102 proceeds to step S104.

In contrast, if there is a possibility that an underflow will occur (Yes at step S102), the conversion unit 102 generates the converted data by converting the segment data to a value that will not allow an underflow to occur (step S103).

Next, the conversion unit 102 generates the extended data by adding a string of "0" bits to the segment data or the converted data (step S104).

As described above, in Embodiment 2, when an avoidable underflow is expected to occur, the calculation of the collective communication function is performed after generating the extended data from the converted data obtained by converting the segment data to a value that will not allow an underflow to occur, and combining the extended data with the second element data. Thus, even when an underflow is expected to occur, the calculation of, the collective communication function may be performed accurately.

In the description of each of the above-described embodiments, the calculation of the collective communication function has been assumed to be an addition or a computation for obtaining the average. However, the calculation of the collective communication function may alternatively be any other computation in which the distributive law holds, such as a subtraction. Examples of computations in which the distributive law holds include a computation that derives from an addition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computing system comprising:
one or more memories; and
one or more processors coupled to the respective one or more memories and the one or more processors each configured to:
determine whether a first data size of first data stored in a first data area of one memory of the one or more memories is greater a second data size of second data stored in a second data area of the one memory;
exchange, when the first data size is equal to or smaller than the second data size, the first data and the second data between the first data area and the second data area;
determine whether a second area size of an area in which the second data is stored is greater than a first area size of an area in which the first data is stored by a given value or more;
divide, when the second area size is greater than the first area size by the given value or more, the first data into segment data having a segment data size smaller than the second data size;
perform a first data conversion on each segment data to generate first extended data by extending the segment data size to the second data size;
perform, when the second area size is not greater than the first area size by the given value or more, a second data conversion on the first data to generate second extended data by adding additional data to the first data;
combine the second data with one of the first extended data and the second extended data to generate combination data;
add information indicating the first extended data or the second extended data to the combination data; and
transmit the combination data with the information to another processor of the one or more processors, wherein
the another processor performs a calculation of a collective communication function using the transmitted combination data and transmits a calculation result to one of the one or more processors.

2. The computing control system according to claim 1 wherein the one of the one or more processors are configured to, in response to receiving the calculation result, dividing the calculation result based on the information which is added to the calculation result.

3. The computing control system according to claim 1 wherein the transmission of the combination data is performed by collective communication.

4. The computing control system according to claim 1, wherein the extending processes includes adding a string of 0 bits to each segment data.

5. A computing control method comprising:
determining, by one or more processors coupled to respective one or more memories, whether a first data size of first data stored in a first data area of one memory of the one or more memories is greater a second data size of second data stored in a second data area of the one memory;
exchanging, when the first data size is equal to or smaller than the second data size, the first data and the second data between the first data area and the second data area;
determining whether a second area size of an area in which the second data is stored is greater than a first area size of an area in which the first data is stored by a given value or more;
dividing, when the second area size is greater than the first area size by the given value or more, the first data into segment data having a segment data size smaller than the second data size;
performing a first data conversion on each segment data to generate first extended data by extending the segment data size to the second data size;
performing, when the second area size is not greater than the first area size by the given value or more, a second data conversion on the first data to generate second extended data by adding additional data to the first data;
combining the second data with one of the first extended data and the second extended data to generate combination data;
adding information indicating the first extended data or the second extended data to the combination data; and transmitting the combination data with the information to another processor of the one or more processors, wherein the another processor performs a calculation of a collective communication function using the transmitted combination data and transmits a calculation result to one of the one or more processors.

6. The computing control method according to claim 5, wherein the another processor performs a calculation of a collective communication function using the transmitted combination data and transmits a calculation result to one of the one or more processors.

7. The computing control method according to claim 5, further comprising, in response to the calculation result, dividing the calculation result based on the information which is added to the calculation result.

8. The computing control method according to claim 5, wherein the transmitting of the combination data is performed by collective communication.

9. The computing control method according to claim 5, wherein the extending processes includes adding a string of 0 bits to each segment data.

10. A non-transitory computer-readable medium storing instructions causing by one or more processors coupled to respective one or more memories to execute processing, the processing comprising:

determining whether a first data size of first data stored in a first data area of one memory of the one or more memories is greater a second data size of second data stored in a second data area of the one memory;

exchanging, when the first data size is equal to or smaller than the second data size, the first data and the second data between the first data area and the second data area;

determining whether a second area size of an area in which the second data is stored is greater than a first area size of an area in which the first data is stored by a given value or more;

dividing, when the second area size is greater than the first area size by the given value or more, the first data into segment data having a segment data size smaller than the second data size;

performing a first data conversion on each segment data to generate first extended data by extending the segment data size to the second data size;

performing, when the second area size is not greater than the first area size by the given value or more, a second data conversion on the first data to generate second extended data by adding additional data to the first data;

combining the second data with one of the first extended data and the second extended data to generate combination data;

adding information indicating the first extended data or the second extended data to the combination data; and transmitting the combination data with the information to another processor of the one or more processors, wherein the another processor performs a calculation of a collective communication function using the transmitted combination data and transmits a calculation result to one of the one or more processors.

\* \* \* \* \*